L. M. KLAUBER.
OIL TESTING APPARATUS.
APPLICATION FILED JULY 25, 1919.
1,371,378.
Patented Mar. 15, 1921.
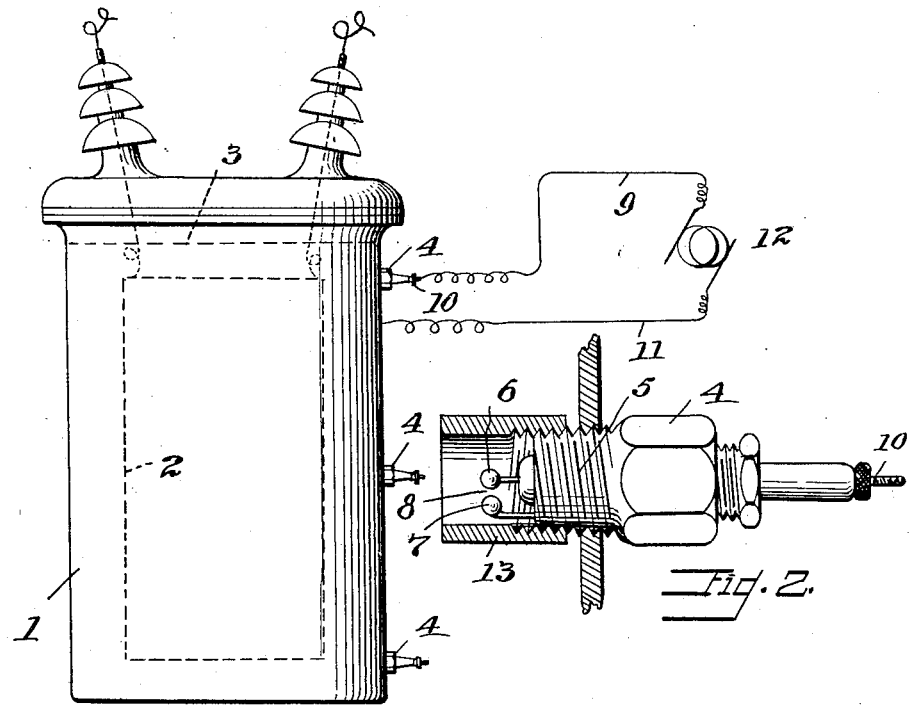
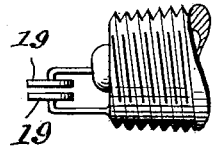
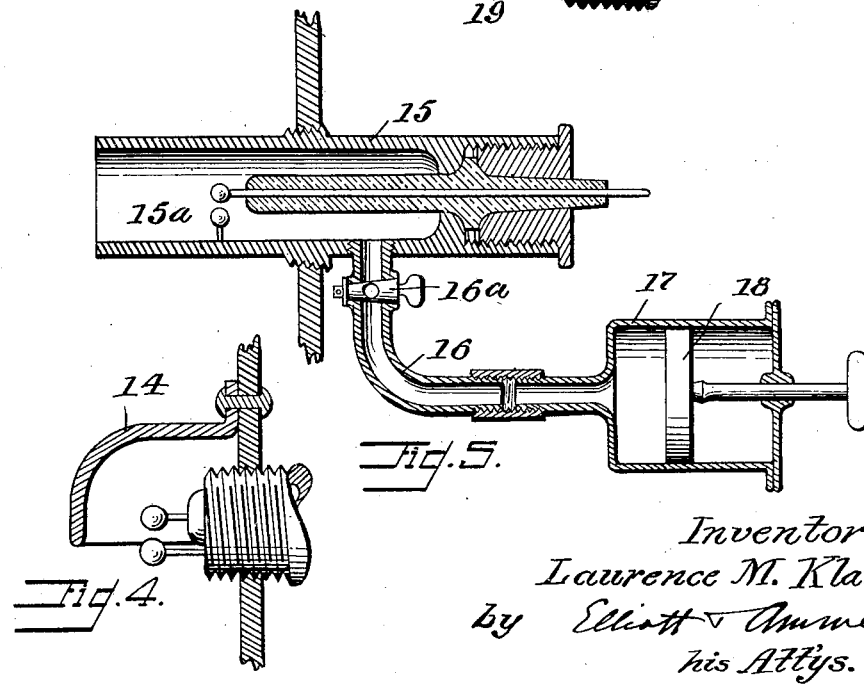
Inventor
Laurence M. Klauber
by Elliott & Ammen
his Att'ys.

UNITED STATES PATENT OFFICE.

LAURENCE M. KLAUBER, OF SAN DIEGO, CALIFORNIA, ASSIGNOR OF ONE-HALF TO THE SAN DIEGO CONSOLIDATED GAS & ELECTRIC COMPANY, OF SAN DIEGO, CALIFORNIA, A CORPORATION OF CALIFORNIA.

OIL-TESTING APPARATUS.

1,371,378.  Specification of Letters Patent.  Patented Mar. 15, 1921.

Application filed July 25, 1919. Serial No. 313,346.

*To all whom it may concern:*

Be it known that I, LAURENCE M. KLAUBER, a citizen of the United States, residing in the city of San Diego and State of California, have invented new and useful Improvements in Oil-Testing Apparatus, of which the following is a specification.

This invention relates to high potential electrical apparatus, and particularly to the kind that employs insulating oil, for example, transformers, oil-break switches, etc. It is a well known fact that the dielectric properties of such oils may deteriorate from various causes, for example, from the accidental addition of even a small quantity of water. For this reason, in practice, it is necessary to test and retest such oils while in use from time to time. This is usually accomplished by removing a small quantity of the oil and testing it; but this method is usually unsatisfactory because great precautions must be taken to insure that the removed oil is a fair sample of the oil in the apparatus, as regards its water content, temperature, etc. The accuracy of the indications from such a test also depends somewhat upon the atmospheric conditions.

The general object of the present invention is to provide simple and reliable means to enable such tests to be conducted in such a way as to overcome the difficulties suggested above.

Further objects of the invention will appear hereinafter.

The invention consists in the novel features and in the general combinations of parts to be particularly described hereinafter, all of which contribute to produce a simple and efficient testing apparatus. A preferred embodiment of my invention will be described in the following specification while the broad scope of my invention will be pointed out in the appended claims.

In the drawing,

Figure 1 is a side elevation of electrical apparatus embodying my invention and illustrating diagrammatically how the apparatus may be tested;

Fig. 2 is a vertical section through the wall of the container, and illustrating a type of test plug that I may employ;

Fig. 3 is a side elevation of the inner end of a test plug showing a modified form for the terminals;

Fig. 4 is a view similar to Fig. 2 but showing another modification, and

Fig. 5 is a vertical section further illustrating details of the invention.

My invention may be applied to any kind of electrical apparatus whatever that employs oil for insulating or other purposes. For the purpose of illustration the accompanying drawing indicates its application to a transformer comprising an outer casing or shell, or container 1, preferably of metal, and carrying within it an electrical device 2 which may consist of induction coils indicated diagrammatically in dotted outline, said electrical device being immersed in an insulating oil filling the container to the level indicated by the dotted line 3.

In order to provide for testing the oil I provide testing means associated with the container for conducting the test on the oil without removing any of the oil from the container. To accomplish this I provide a test plug for testing the oil; I prefer to provide a plurality of testing plugs 4 which are attached in the wall of the container respectively at different levels.

A simple embodiment for one of these test plugs is shown in Fig. 2. The plug has a threaded nipple 5 that screws into a threaded opening in the wall of the container, and is provided with two terminals or electrodes 6 and 7, which may be of the ball form, illustrated, insulated from each other, the terminal 7 being metallically connected to the metal wall of the plug, and hence is grounded to the wall of the container.

Any suitable testing apparatus, preferably a portable apparatus, may be employed for testing the dielectric resistance of the gap 8 between the terminals, which gap is filled with the insulating oil within the container. This testing apparatus includes a conductor 9 which is connected to the binding post 10 of the terminal 6, and a conductor 11 that is grounded against the side of the container.

These conductors form two sides of a circuit passing through a testing apparatus 12 which may be of the type popularly known as a "megger," and operating to indicate in meg-ohms, the dielectric resistance of the gap 8; or testing apparatus 12 may be a high potential testing transformer to indicate in volts, the dielectric strength of the gap 8.

By means of this testing apparatus the dielectric property of the oil may be determined under actual working conditions, and is consequently very accurate.

The tests should be made at each plug, and the results will give a very close indication of the condition of the oil.

It may happen that the heating of the oil may tend to form sludge deposits around the electrodes, that might interfere with the accuracy of the test. In order to prevent this I may provide a protector or hood associated with the electrodes. This hood may be in the form of a cylindrical sleeve 13 that is screwed onto the end of the plug and envelops the electrodes. (See Fig. 2.) But this hood may be simply in the form of a bent plate 14 riveted to the inner face of the wall. (See Fig. 4.)

In situations where there is great difficulty from the accumulation of sludge I may provide means for agitating the oil in the vicinity of the electrodes. Such means is shown in Fig. 5, in which the plug 15 has a tubular body forming a chamber 15ª to protect the electrodes, and this chamber has a goose neck connection 16 for attaching a hand pump 17. When the piston 18 of this pump is reciprocated, it will produce a violent ebb and flow of oil in the chamber 15ª and thereby clear the electrodes of all sludge deposits.

A stop-cock 16ª can be closed at will, thereby enabling the same pump to be used for clearing a number of different plugs.

Instead of employing electrodes of spherical form, as shown, I may employ electrodes such as the electrodes 19, of the disk form indicated in Fig. 3.

It is understood that the embodiment of the invention described above is only one of the many embodiments my invention may take, and I do not wish to be limited in the practice of the invention nor in my claims, to the particular embodiment of the invention set forth.

What I claim and desire to secure by Letters Patent, is:

1. In a high potential electrical apparatus, the combination of an electric device, a container inclosing the same and carrying a bath of insulating oil enveloping the electric device, and a testing plug removably secured in the wall of the container and carrying a pair of insulated terminals held at a predetermined distance apart and disposed within the insulating oil.

2. In a high potential electrical apparatus, the combination of an electrical device, a container inclosing the same and carrying a bath of insulating oil enveloping said electrical device, a plurality of testing plugs mounted in the wall of said container, respectively at different levels, each of said plugs having a pair of terminals with a gap between them, said gap being filled by a portion of the oil, whereby the dielectric resistance of said gaps will indicate the dielectric quality of said oil while resting undisturbed within the container.

3. In a high potential electrical apparatus, the combination of an electrical device, a container inclosing the same and carrying a bath of insulating oil enveloping said electrical device, a plurality of testing plugs mounted respectively at different levels, each of said plugs having two terminals with a gap between them filled by the oil, and means for shielding the said terminals on their upper side to reduce the deposit of sludge which might accumulate on and around said terminals.

4. In a high potential electrical apparatus, the combination of an electrical device, a container inclosing the same and carrying a bath of insulating oil enveloping said electrical device, a plurality of testing plugs mounted respectively at different levels, each of said plugs having a pair of terminals with a gap between them filled by the oil, and means for agitating the oil in the vicinity of the gaps.

5. In a high potential electrical apparatus, the combination of a transformer, a container inclosing the same and carrying a bath of insulating oil enveloping the transformer, a plug removably secured in the wall of the container and carrying a pair of insulated terminals held at a predetermined distance apart and disposed within the insulating oil, and means for shielding the terminals on their upper side to reduce the deposit of sludge which might accumulate on and around said terminals.

6. In a high potential electrical apparatus, the combination of a transformer, a container inclosing the same and carrying a bath of insulating oil, a plug removably secured in the wall of the container and carrying a pair of insulated terminals held at a predetermined distance apart and disposed within the insulating oil, and means for agitating the oil in the vicinity of the terminals.

7. In a high potential electrical apparatus, the combination of a transformer, a container inclosing the same and carrying a bath of insulating oil, a plug removably mounted in the wall of the container and carrying a pair of insulated terminals disposed a predetermined distance apart and disposed within the oil, said plug having means connected therewith for agitating the oil in the vicinity of said terminals.

In testimony whereof, I have hereunto set my hand.

LAURENCE M. KLAUBER.